United States Patent [19]

Crawford

[11] Patent Number: 4,971,602
[45] Date of Patent: Nov. 20, 1990

[54] METHOD FOR GRINDING GEAR TEETH

[76] Inventor: Robert B. Crawford, 3621 Cass Elizabeth Lake Rd., Pontiac, Mich. 48054

[21] Appl. No.: 413,009

[22] Filed: Sep. 26, 1989

[51] Int. Cl.$^5$ .............................................. B24D 3/00
[52] U.S. Cl. ....................................... 511/293; 51/309
[58] Field of Search ................................ 51/293, 309

[56] References Cited

U.S. PATENT DOCUMENTS

| | | | |
|---|---|---|---|
| 3,756,796 | 9/1973 | Miller | 51/293 |
| 3,829,298 | 8/1974 | Ainoura | 51/293 |
| 3,921,616 | 11/1975 | Kish | 51/293 |
| 4,476,656 | 10/1984 | Bovenkerk . | |
| 4,649,671 | 3/1987 | Erhardt et al. . | |
| 4,677,962 | 7/1987 | Loos et al. . | |
| 4,696,130 | 9/1987 | Belthle | 51/293 |

Primary Examiner—William R. Dixon, Jr.
Assistant Examiner—Willie Thompson
Attorney, Agent, or Firm—Remy J. VanOphem

[57] ABSTRACT

A method for form grinding gears is disclosed using diamond or cubic boron nitride as the abrasive including form grinding a female wheel with a master gear form grinding wheel to produce a desired gear tooth profile on the circumference of the female wheel. The female wheel is then made oversize by bonding diamond or cubic boron nitride abrasive to its grinding surface. A male wheel is then form ground with the female wheel to produce a undersized tooth profile on the male wheel. After the male wheel is plated with diamond or cubic boron nitride abrasive it is at the desired tooth profile and can then be used to form grind gears having the desired tooth profile.

6 Claims, 3 Drawing Sheets

METHOD FOR GRINDING GEAR TEETH

BACKGROUND OF THE INVENTION

1. Field of the Invention

The present invention generally relates to gear form grinding wheels. More specifically, this invention relates to an economical method for forming gears through the use of a bonded diamond or cubic boron nickel (CBN) gear form grinding wheel which is fabricated using another gear form grinding wheel of similar construction.

2. Description of the Prior Art

Grinding wheels are extensively used for numerous fabrication operations including the abrasive machining of gears. Gear grinding wheels are typically of the disk-type variety and have either an abrasive which is dispersed in a binder or resin matrix, or an abrasive which is bonded to the surface of the wheel. One type of disk which represents the present invention is the gear form grinding wheel which is used in a process known as form grinding. In this process, one or more gear teeth are concurrently ground with a grinding wheel whose circumferential surface has a profile which is the inverse of the desired gear tooth profile. In this manner a gear blank can be ground entirely by the gear forming wheel down to the preferred tooth form. Another variation of the disk is a gear-like member whose teeth are intended to mesh with the gear to be manufactured. Such form is known as grinding-generating and is normally limited to abrasive machining of a gear form that previously has been hogged out to roughly the desired gear form.

The grinding wheel abrasives provide the wheel's cutting action. Examples of abrasives suitable for abrasive machining are natural and man-made diamond and cubic boron nitride (CBN), a well known man-made abrasive having a Knoop hardness second only to diamond. CBN is commercially available in many forms, such as an abrasive powder known as Borazon which was developed by the General Electric Company. Both diamond and CBN are noted for their high material removal rates and are typically limited to being bonded to the grinding surface of a metal wheel to improve the structure's shock-resistance.

A typical bonding method well known in the art is to use an electroplating process, such as electroplated nickel, to bond the abrasive to the surface of the wheel. Additionally, to improve the life and material removal rate of such grinding wheels it is known in the art to plate the bonded abrasive grinding surface with titanium nitride. Both electroplated nickel and titanium nitride are well accepted by the industry and are commercially available.

All grinding wheels normally sustain wear through their use. A process referred to as truing is typically used to maintain the grinding wheel to ensure the desired gear tooth form is obtained on the gear blank. Of particular concern is that the grinding wheel surface also becomes dull and "loaded" with chips through use. A process referred to as dressing is used to remove this ineffective surface and expose newly fractured abrasive grains. However, the truing process, and to a much greater extent the dressing process, shorten the life of the grinding wheel, thus requiring replacement of the wheel with a new wheel. Also, dressing of grinding wheels having the abrasive bonded to the grinding surface as described earlier for diamond and CBN wheels is typically discouraged because of the relatively thin film of abrasive deposited on the grinding surface.

Therefore, a general disadvantage of the gear grinding processes known thus far is the continuous requirement for truing and dressing of the grinding wheel. A disadvantage specific to grinding wheels of the type with the abrasive bonded to the grinding surface is the inability to dress the grinding surface, requiring frequent replacement of the wheel. The result can be inefficient and somewhat less than economical method for producing precision ground gears. Efforts have been made to improve truing and dressing techniques as suggested below.

A method for dressing CBN grinding wheels is disclosed in U.S. Pat. No. 4,476,656 to Bovenkerk which relies on using a cemented metal carbide block to improve the grinding wheel surface without excessive removal of the CBN grit. However, this method does not lend itself to effective use with grinding wheels for the manufacture of gear teeth.

A method suitable for dressing "abrasive gear-like precision tools" is disclosed in U.S. Pat. No. 4,677,962 to Loos et al. An improved method for dressing a CBN grinding-generating wheel with a diamond wheel is disclosed in U.S. Pat. No. 4,649,671 to Erhardt et al. However, neither method disclosed applies to gear form grinding wheels and neither suggest a gear manufacturing process.

U.S. Pat. No. 4,697,387 to Wirz shows the use of a gear form grinding wheel for the production of helical toothed gears but does not suggest any reduction in the need for dressing.

Therefore, what is needed is a method for grinding gear teeth with a gear form grinding wheel that is economically more efficient by reducing or eliminating the need for truing and dressing and, therefore, eliminating the requirement for frequent replacement of the wheel, resulting in a reduction in overall expenses associated therewith.

SUMMARY OF THE INVENTION

It is an object of the present invention to provide a method for grinding gears which eliminates the need for truing and dressing of the surface profile of the gear forming wheel, concurrently increasing the rate of manufacture of gears.

It is a further object of the present invention that such method provide for the use of gear form grinding wheels having diamond or CBN bonded to the grinding surface to improve material removal rates and durability of the wheel, improving abrasive machining efficiency.

In accordance with the preferred embodiment of this invention, these and other objects and advantages are accomplished as follows.

According to the present invention there is provided a method for the manufacture of gears which eliminates the need for truing and dressing. The method includes providing a female blank wheel which is roughed out from solid and provided with the desired pressure angle. The female wheel is then finished with a master gear form grinding wheel, the master gear form grinding wheel having an inverse gear tooth form which is the complementary form to the gear tooth form desired. The female wheel is then plated with an abrasive compound which produces an undersize surface profile as compared to the desired gear tooth form previously provided by the master gear form grinding wheel.

A second blank wheel, designated the male wheel, is also roughed out and provided with the desired pressure angle. The male wheel is then ground with the female wheel forming an inverse gear tooth form which is similar but undersized when compared to the inverse gear tooth form of the master gear form grinding wheel. The male wheel is then plated with an abrasive compound thereby substantially reproducing the inverse gear tooth form of the master gear form grinding wheel. Gear blanks are then ground with the male wheel to form gears substantially having the desired gear tooth form.

According to a preferred aspect of this invention, the male wheel does not require truing or dressing, but is readily replaced with another substantially identical male wheel upon becoming dull or loaded with remnants of the removed material. The removal rate and life of both the male and female wheels may be enhanced by the inclusion of a titanium nitride coating process which protects the abrasive composition.

A significant advantage of the disclosed invention is that the method substantially eliminates the subsequent use, and therefore wear and maintenance, of the master gear form grinding wheel having the original inverse tooth form.

Other objects and advantages of this invention will be better appreciated after a reading of the detailed description thereof which follows taken in conjunction with the drawings appended hereto.

DETAILED DESCRIPTION OF THE PREFERRED EMBODIMENT

Figure 1:
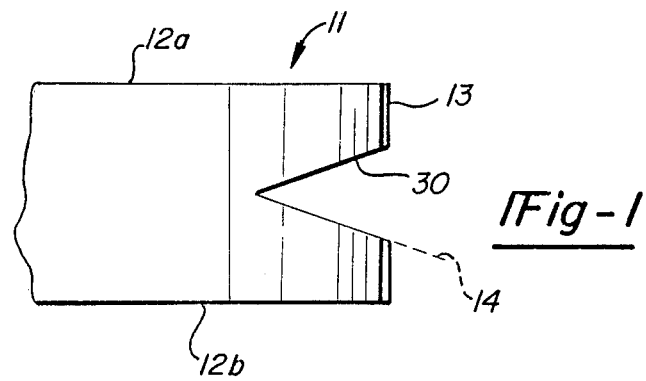
FIG. 1 is a partial cross-sectional view of a female gear form grinding wheel having the roughed out tooth form of a desired gear tooth form.

In a preferred embodiment of this invention, a female wheel 11 as shown in FIG. 1 is provided in an un-heat treated condition and has a roughed out tooth form 30 of a desired gear tooth form 10. After heat treating the female wheel 11 to a hardness of approximately 32 to 36 Rc the sides of the female wheel 11 are trued to form substantially parallel wheel faces 12a and 12b. The outer circumference 13 is then trued substantially perpendicular to the wheel faces 12a and 12b. A desired pressure angle 14 is then attained on the roughed out tooth form 30 of the female wheel 11.

Figure 2:
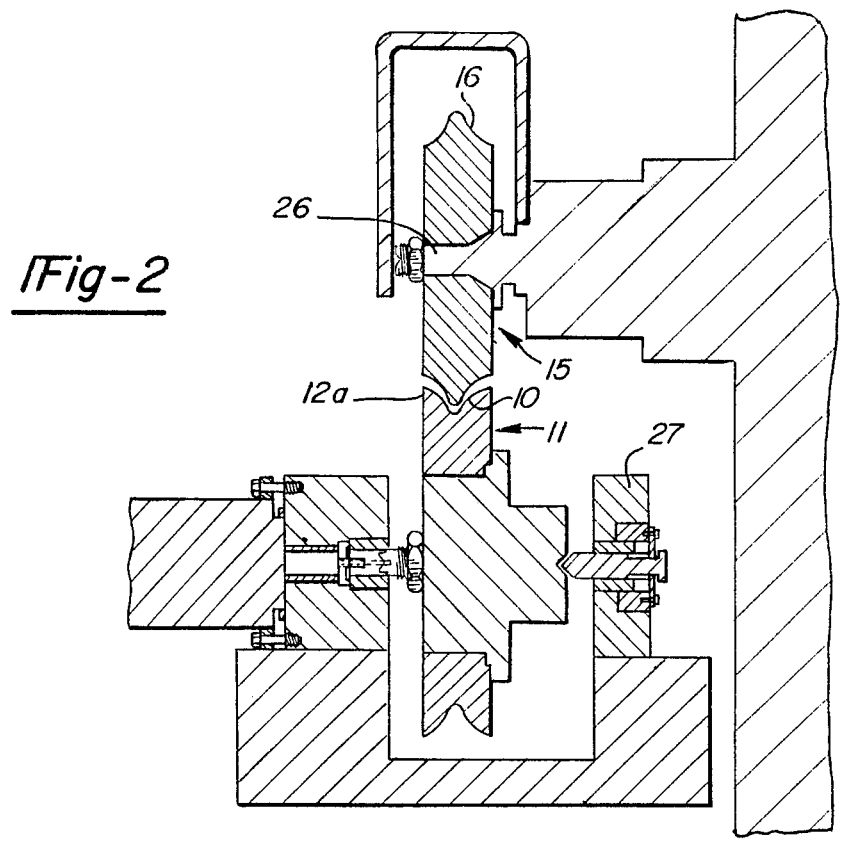
FIG. 2 shows the female gear form grinding wheel shown in FIG. 1 being ground by a master gear form grinding wheel in accordance with a preferred embodiment of this invention.

As shown in FIG. 2, a master grinding wheel 15 mounted on a suitable spindle 26 and having the inverse gear tooth form 16 of the desired gear tooth form 10 is then used to grind the female wheel 11 while the female wheel 11 is mounted on a suitable tool 27 to precisely form the desired gear tooth form 10 on the female wheel 11.

Figure 3:
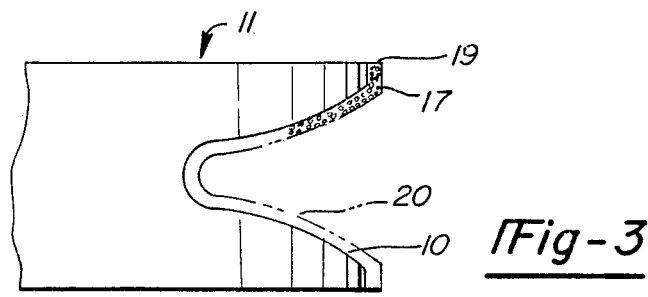
FIG. 3 is a partial cross sectional view of a female gear forming wheel having an abrasive bonded to its circumferential surface in accordance with a preferred embodiment of the invention.

An abrasive 17 such as diamond or CBN is then bonded to a desired gear tooth form 10 of the female wheel 11 with electroplated nickel 19 to a thickness of approximately 0.003 inches. The electroplated nickel 19 forms a second gear tooth form 20 on the female wheel 11, as shown in FIG. 3, which is 0.003 inches undersized compared to the desired tooth form 10 as previously formed by the master grinding wheel 15.

Figure 4:
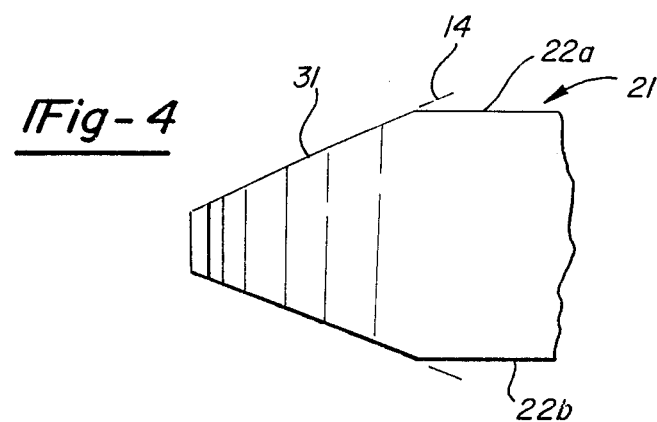
FIG. 4 is a partial cross sectional view of a male gear form grinding wheel having the roughed out inverse tooth form of a desired gear tooth form.

A male wheel 21, as shown in FIG. 4, is provided in an un-heat treated condition and has the roughed out inverse tooth form 31 of the inverse gear tooth form 16. After heat treating the male wheel 21 to a hardness of approximately 32 to 36 Rc the sides of the male wheel 21 are trued to form substantially parallel wheel faces 22a and 22b. The desired pressure angle 14 is then attained on the roughed out inverse tooth form 31 of the male wheel 21.

Figure 5:
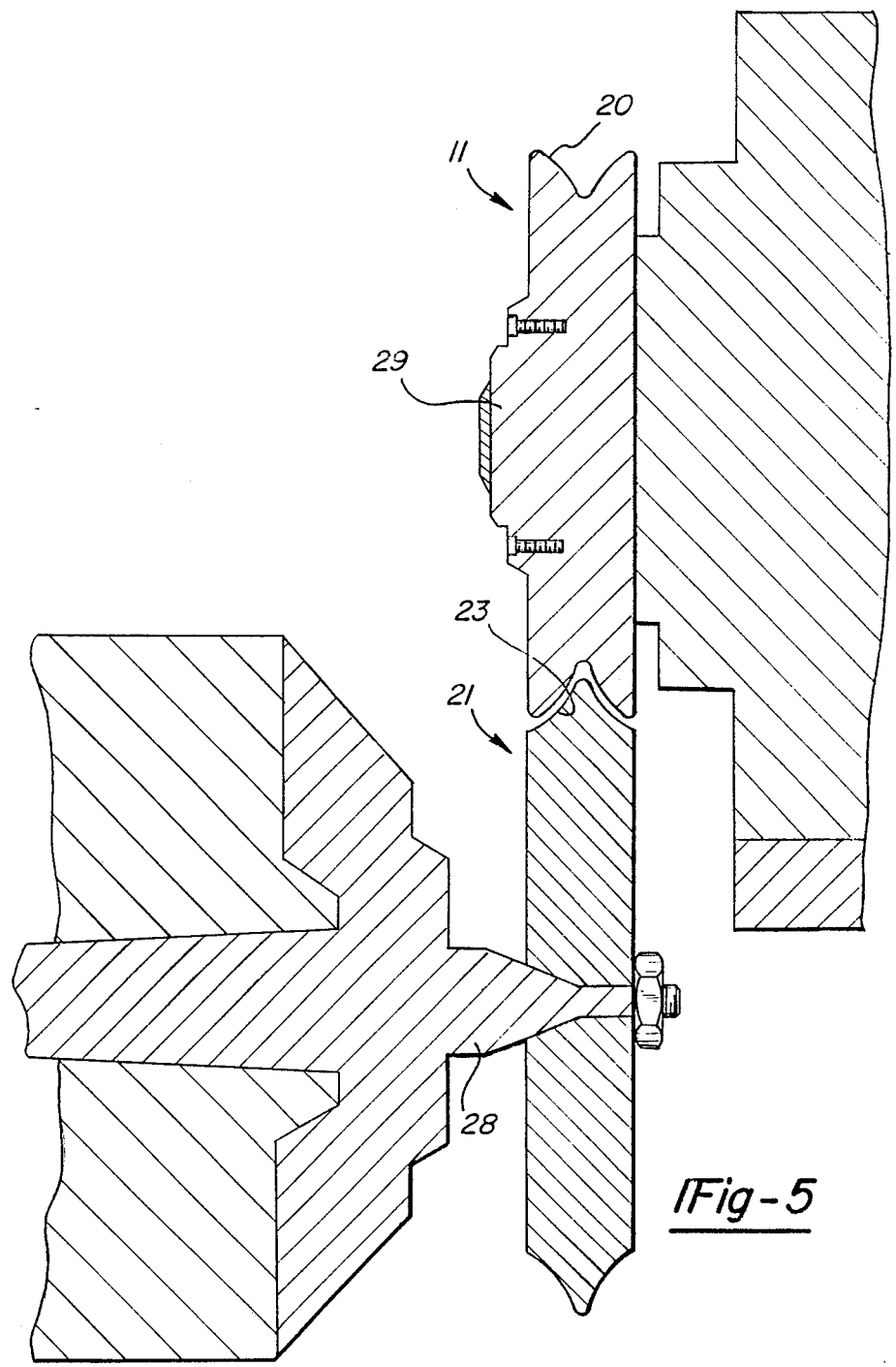
FIG. 5 shows the male gear form grinding wheel shown in FIG. 4 being formed by a female gear forming wheel in accordance with a preferred embodiment of this invention.

The male wheel 21 is then mounted to a second tool 28 and ground with the female wheel 11 which is mounted to a second spindle 29 as shown in FIG. 5. This grinding operation forms a second inverse gear tooth form 23 which is undersized compared to the inverse gear tooth form 16.

Figure 6:
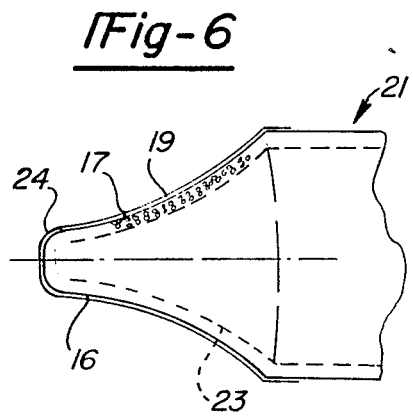
FIG. 6 is a partial cross sectional view of a male gear form grinding wheel having an abrasive bonded to its circumferential surface in accordance with a preferred embodiment of this invention.

As shown in FIG. 6, the abrasive 17 such as diamond or CBN is then bonded to the second inverse gear tooth form 23 of the male wheel 21 with the electroplated nickel 19 to a thickness of approximately 0.003 inches. The electroplated nickel 19 substantially reproduces the inverse gear tooth form 16 of the master grinding wheel 15.

To further improve the life and material removal rate of the male wheel 21 a layer of titanium nitride 24 can be applied to a depth of approximately 0.0002 inches upon the inverse gear tooth form 16 of the male wheel 21.

Figure 7:
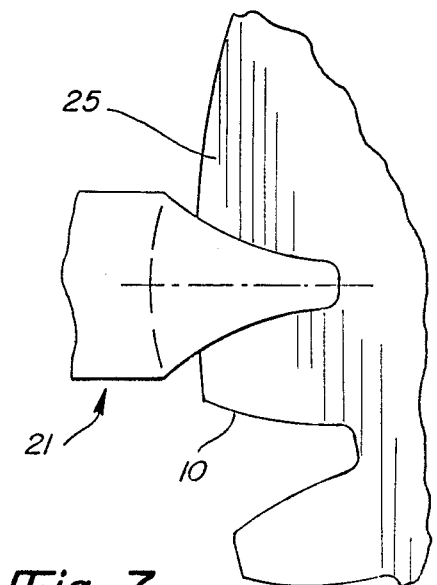
FIG. 7 is a partial cross sectional view of a male gear form grinding wheel being used to abrasive machine a gear using the gear forming process.

The male wheel 21 can then be used to grind a gear blank 25 to form substantially the desired gear tooth form 10 as shown in FIG. 7.

In the preferred embodiment, a significant advantage of fabricating a female wheel 11 to produce a male wheel 21 is the ability to readily use the more durable and efficient bonded diamond or CBN wheel type of gear form grinding wheel for forming the desired tooth profile. The need to use the master gear form grinding wheel 15 to produce the desired tooth profile is eliminated. Thus there is also no requirement to continually true and dress the master grinding wheel 15 which would eventually necessitate its replacement, involving the repeated, tedious process of achieving and proving the form of the desired tooth profile 10. In using the method of the present invention, a plurality of male wheels 21 can be made allowing the rapid replacement of a worn male wheel with a second male wheel to minimize downtime.

While the invention has ben described in terms of a preferred embodiment, it is apparent that other forms could be adopted by one skilled in the art. An example is the inclusion of a crushing process to provide for seating the diamond or CBN securely in the nickel plating of the male wheel 21. A second example is the substitution of other known plating processes for the electroplated nickel. Accordingly, the scope of the invention is to be limited only by the following claims.

What is claimed is:

1. A method for forming a gear, said method comprising the steps of:
   providing a first gear blank;
   providing a grinder having inverse gear tooth form, said inverse gear tooth form being the complementary form to a gear tooth form;
   grinding said first gear blank with said grinder to form a female wheel, said grinding forming said gear tooth form on said female wheel;
   plating said female wheel with an abrasive compound, said plating forming a second gear tooth form, said second gear tooth form being undersized relative to said gear tooth form;
   providing a second gear blank;
   grinding said second gear blank with said female wheel to form a male wheel, said grinding forming a second inverse gear tooth form on said male wheel, said second inverse gear tooth form being undersized relative to said inverse gear tooth form;
   plating said male wheel with an abrasive compound, said plating reproducing said inverse gear tooth form; and
   grinding gear blanks with said male wheel to form gears having said gear tooth form.

2. The method as claimed in claim 1, wherein said male wheel is plated with titanium nitride to a depth of approximately 0.0002 inches following said step of plating said male wheel with an abrasive compound.

3. A method for forming a gear, said method comprising the steps of:
   providing a female wheel having a roughed-out form of a gear tooth form;
   heat treating said female wheel to a hardness of approximately 32 to 36 Rc;
   truing said female wheel to form parallel wheel faces on said female wheel;
   truing said female wheel to form an outer circumference perpendicular to said wheel faces on said female wheel;
   forming a presure angle corresponding to said gear tooth form on said female wheel;
   providing a grinder having inverse gear tooth form, said inverse gear tooth form being the complementary form to said gear tooth form;
   grinding said female wheel with said grinder to form said gear tooth form on said female wheel;
   nickel electroplating said female wheel with diamond or cubic-boron nickel to a thickness of approximately 0.003 inches, said nickel electroplating forming a second gear tooth form on said female wheel, said second gear tooth form being oversized compared to said gear tooth form;
   providing a male wheel having a roughed-out form of said inverse gear tooth form;
   heat treating said male wheel to a hardness of approximately 32 to 36 Rc;
   truing said male wheel to form parallel wheel faces;
   grinding said male wheel with said female wheel, said grinding forming a second inverse gear tooth form, said second inverse gear tooth form being undersized compared to said inverse gear tooth form;
   nickel electroplating said male wheel with diamond or cubic-boron nickel to a thickness of approximately 0.003 inches, said nickel electroplating reproducing said inverse gear tooth form; and
   grinding gear blanks with said male wheel to form gears having said gear tooth form.

4. The method as claimed in claim 3, wherein said male wheel is plated with titanium nitride to a depth of approximately 0.0002 inches following said step of hardening said nickel plating of said male wheel.

5. A method for economically abrasive machining a gear with a bonded diamond or CBN gear form grinding wheel, said method comprising the steps of:
   providing a pair of female wheels having a roughed-out form of a gear tooth form;
   heat treating each of said pair of female wheels to a hardness of approximately 32 to 36 Rc;
   truing each of said pair of female wheels to form parallel wheel faces on each of said pair of female wheels;
   truing each of said pair of female wheels to form an outer circumference perpendicular to said wheel faces on each of said pair of female wheels;
   forming a pressure angle corresponding to said gear tooth form on each of said pair of female wheels;
   providing a grinder having inverse gear tooth form, said inverse gear tooth form being the complementary form to said gear tooth form;
   grinding each of said pair of female wheels with said grinder to form said gear tooth form on each of said pair of female wheels;
   nickel electroplating a first female wheel of said pair of female wheels with diamond or cubic-boron nickel to a thickness of approximately 0.003 inches, said nickel electroplating forming a second gear tooth form on said first female wheel, said second gear tooth form being oversized relative to said gear tooth form;
   providing a male wheel having a roughed-out form of said inverse gear tooth form;
   heat treating said male wheel to a hardness of approximately 32 to 36 Rc;
   truing said male wheel to form parallel wheel faces;
   grinding said male wheel with said first female wheel, said grinding forming a second inverse gear tooth form, said second inverse gear tooth form being undersized relative to said inverse gear tooth form;
   nickel electroplating said male wheel with diamond or cubic-boron nickel to a thickness of approximately 0.003 inches, said nickel electroplating reproducing said inverse gear tooth form;
   crushing said male wheel with a second female wheel of said pair of female wheels, said crushing providing for seating said cubic-boron nickel or diamond in said nickel electroplating; and
   grinding gear blanks with said male wheel to form gears having said gear tooth form.

6. The method as claimed in claim 5, wherein said male wheel is plated with titanium nitride to a depth of approximately 0.0002 inches following said step of hardening said nickel plating of said male wheel.

* * * * *

UNITED STATES PATENT AND TRADEMARK OFFICE
CERTIFICATE OF CORRECTION

PATENT NO. : 4,971,602
DATED : November 20, 1990
INVENTOR(S) : Robert B. Crawford It is certified that error appears in the above-identified patent and that said Letters Patent is hereby corrected as shown below:

Column 2, line 9, after "be" insert ---- an ----.

Column 4, line 65, delete "ben" and insert ---- been ----.

Column 5, line 10, after "having" insert ---- an ----.

Column 5, line 46, delete "presure" and insert ---- pressure ----.

Column 5, line 48, after "having" insert ---- an ----.

Column 6, line 29, after "having" insert ---- an ----.

Column 6, line 53, before "re-" insert ---- substantially ----.

Signed and Sealed this

Nineteenth Day of May, 1992

Attest:

DOUGLAS B. COMER

*Attesting Officer*    *Acting Commissioner of Patents and Trademarks*